(12) United States Patent
Cooper

(10) Patent No.: US 9,575,311 B2
(45) Date of Patent: Feb. 21, 2017

(54) MAGNIFYING CONTAINER APPARATUS

(71) Applicant: Seneca S. Cooper, Paulsboro, NJ (US)

(72) Inventor: Seneca S. Cooper, Paulsboro, NJ (US)

( * ) Notice: Subject to any disclaimer, the term of this patent is extended or adjusted under 35 U.S.C. 154(b) by 433 days.

(21) Appl. No.: 14/083,454

(22) Filed: Nov. 19, 2013

(65) Prior Publication Data
US 2015/0138655 A1 May 21, 2015

(51) Int. Cl.
*G02B 27/02* (2006.01)
*G02B 25/00* (2006.01)
*B63C 11/48* (2006.01)
*A01K 61/00* (2006.01)
*A01K 63/00* (2006.01)

(52) U.S. Cl.
CPC ............. *G02B 25/008* (2013.01); *A01K 61/00* (2013.01); *A01K 63/00* (2013.01); *B63C 11/48* (2013.01); *G02B 25/002* (2013.01)

(58) Field of Classification Search
USPC ................ 359/802–805, 808, 810, 811, 813, 815, 359/819–822
See application file for complete search history.

(56) References Cited

U.S. PATENT DOCUMENTS

| | | | |
|---|---|---|---|
| 1,451,096 A | 4/1923 | Hagen et al. | |
| 2,730,921 A | 1/1956 | Little et al. | |
| 2,820,580 A * | 1/1958 | Figge | E04D 15/07 220/578 |
| 3,359,677 A | 12/1967 | Hepler et al. | |
| 3,619,042 A | 11/1971 | Lazar et al. | |
| D271,988 S | 12/1983 | Rivollet | |
| 4,765,472 A | 8/1988 | Dent | |
| 4,844,595 A | 7/1989 | Nealy | |
| 4,856,673 A | 8/1989 | Thompson | |
| D321,382 S | 11/1991 | Laib et al. | |
| D374,043 S | 9/1996 | Ryaa et al. | |
| D398,663 S | 9/1998 | Freelander | |
| 6,023,382 A | 2/2000 | Hollingsworth et al. | |
| 6,055,098 A * | 4/2000 | Lett | G02B 23/08 359/402 |
| D505,688 S | 5/2005 | Allen | |
| 6,888,673 B2 | 5/2005 | Reynolds | |
| D567,300 S | 4/2008 | Kramer | |

(Continued)

*Primary Examiner* — Joseph P Martinez
*Assistant Examiner* — Brandi Thomas
(74) *Attorney, Agent, or Firm* — Ash Tankha; Lipton, Weinberger & Husick

(57) ABSTRACT

A magnifying container apparatus including a generally cylindrical member and one or more magnifying lenses is provided for magnifying, viewing, and carrying items. A magnifying lens is detachably connected to the lower end of the cylindrical member to close the lower end. The magnifying lens magnifies the items present below the magnifying lens. The cylindrical member accommodates and carries the items within a space defined by a generally cylindrical wall and between an open upper end and the closed lower end of the cylindrical member. The magnifying container apparatus further includes a threaded rod, a threaded wheel, and a generally cylindrical sieve member. The sieve member drains a predetermined amount of an extraneous element from the magnifying container apparatus, when the threaded rod, in communication with the threaded wheel, traverses the magnifying lens from the lower end of the cylindrical member toward a lower end of the sieve member.

14 Claims, 21 Drawing Sheets

(56) References Cited

U.S. PATENT DOCUMENTS

| | | | |
|---|---|---|---|
| 8,505,766 B2* | 8/2013 | Aitchison | G02B 25/005 220/694 |
| 8,806,803 B1* | 8/2014 | Mitchell | A01K 97/05 206/315.11 |
| 2002/0085290 A1* | 7/2002 | Taylor | A47G 19/025 359/803 |

* cited by examiner

MAGNIFYING CONTAINER APPARATUS

BACKGROUND

Magnifying lenses, generally made of glass, are typically used in a wide range of products, for example, handheld lenses, telescopes, cameras, etc., for magnifying items. Magnifying lenses also find applications in under water viewing and aquatic research. A handheld device, for example, a handheld telescope, is generally used to view items, for example, elements of marine life such as starfish, sea shells, mussels, shrimp, plants, moss, rocks, pebbles, etc. Researchers and diving experts carry shovels, bags, buckets, etc., along with the handheld telescopes for viewing and carrying items. They view the items using the handheld telescopes and then transfer the items into the bags or buckets using the shovels. A magnifying lens is typically provided as an independent component in a kit, for example, a beach bucket kit. The beach bucket kit includes a bucket, a shovel, and a handheld magnifying lens. A user views items in a shallow sea bed using the handheld magnifying lens and then uses the shovel to transfer the items from the shallow sea bed to the bucket. The user then carries the items in the bucket. The user has to carry two independent components, that is, the bucket and the handheld magnifying lens separately for performing multiple functions, for example, magnifying, viewing, and carrying different items, which requires more effort and is inconvenient.

Hence, there is a long felt but unresolved need for a combination magnifying container apparatus that allows a user to perform multiple functions, for example, magnifying, viewing, and carrying different items, for example, elements of marine life such as starfish, sea shells, mussels, shrimp, plants, moss, rocks, pebbles, etc., without having to carry separate independent components.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The apparatus disclosed herein addresses the above mentioned need for a combination magnifying container apparatus that allows a user to perform multiple functions such as magnifying, viewing, and carrying different items, without having to carry separate independent components. As used herein, the term "item" refers to any object, for example, elements of marine life such as starfish, sea shells, mussels, shrimp, plants, moss, rocks, pebbles, other aquatic elements, insects such as spiders, ants, etc., frogs, and other animals, etc., that can be viewed or identified at different areas, for example, in a shallow sea bed, an ocean, a pool, a bath tub, etc. The magnifying container apparatus disclosed herein comprises a generally cylindrical member and one or more magnifying lenses. The cylindrical member is configured, for example, in the shape of a bucket such as a cylindrical bucket, a truncated cone shaped bucket, etc. The cylindrical member comprises an open upper end and a lower end separated by a generally cylindrical wall extending therebetween. A magnifying lens is detachably connected to the lower end of the cylindrical member to close the lower end of the cylindrical member. The magnifying lens is, for example, a convex lens, a concave lens, or a combination thereof.

In an embodiment, the magnifying container apparatus further comprises a lower threaded section configured proximal to the lower end of the cylindrical member and along the inner surface of the cylindrical wall of the cylindrical member. A threaded edge of the magnifying lens is detachably engaged with the lower threaded section of the cylindrical member for detachably connecting the magnifying lens to the lower end of the cylindrical member. In another embodiment, the magnifying lens is hingedly connected to the lower end of the cylindrical member for opening and closing the lower end of the cylindrical member. The magnifying lens is configured to magnify and identify the items present below the magnifying lens and to enable viewing of the items. The cylindrical member accommodates and carries the items within a space defined by the cylindrical wall and between the open upper end and the closed lower end. The magnifying container apparatus enables a user to magnify and identify items, for example, sea shells, mussels, shrimp, etc., from a sea bed and to pick them up.

In an embodiment, the magnifying container apparatus disclosed herein further comprises one or more supplementary magnifying lenses of predetermined sizes positioned within the space defined by the cylindrical wall and between the open upper end and the closed lower end of the cylindrical member. The supplementary magnifying lenses are connected along an inner surface of the cylindrical wall of the cylindrical member. The supplementary magnifying lenses comprise, for example, a concave lens, a convex lens, or a combination thereof. The supplementary magnifying lenses traverse along a track configured along the inner surface of the cylindrical wall from the open upper end to the closed lower end of the cylindrical member. In an embodiment, the magnifying container apparatus disclosed herein further comprises a handle member detachably attached at the open upper end of the cylindrical member. The handle member is configured to be held by a user for carrying the magnifying container apparatus. In another embodiment, the magnifying container apparatus disclosed herein further comprises one or more handle grips defined proximal to the open upper end of the cylindrical member. The handle grips are configured to be gripped by a user for gripping the magnifying container apparatus.

In another embodiment, the magnifying container apparatus disclosed herein further comprises one or more pouches attached at the open upper end of the cylindrical member for storing one or more of the items. In another embodiment, the magnifying container apparatus disclosed herein further comprises a spout defined at the open upper end of the cylindrical member. The spout converges flow of an extraneous element contained in the magnifying container apparatus and conveys the extraneous element out from the magnifying container apparatus. As used herein, the term "extraneous element" refers to any element, for example, water or another liquid, sand, etc., that is external to the items to be magnified, viewed, or collected by a user. In another embodiment, the magnifying container apparatus disclosed herein further comprises one or more light sources operably connected to one or more locations on the cylindrical member. The light sources illuminate the magnifying container apparatus and areas proximal to the magnifying container apparatus.

In an embodiment, the magnifying container apparatus disclosed herein further comprises a trap assembly detachably attached to the closed lower end of the cylindrical member. The trap assembly comprises, for example, a rod member and a net member. The rod member is hingedly connected to the closed lower end of the cylindrical member.

The rod member is configured to accommodate particles, for example, food particles to attract items such as fish for viewing through the magnifying lens. The net member is detachably attached to the closed lower end of the cylindrical member. The net member traps the items below the closed lower end of the cylindrical member.

In an embodiment, the magnifying container apparatus disclosed herein is also used for carrying the items in a desired or selectable amount of an extraneous element, for example, water in the magnifying container apparatus. In this embodiment, the magnifying container apparatus disclosed herein further comprises at least one guide ring member, a threaded rod, a threaded wheel, and a generally cylindrical sieve member. The guide ring member is fixedly attached to an outer cylindrical wall of the cylindrical member. The threaded rod is slidably inserted into the guide ring member. The magnifying lens is operably connected to a lower end of the threaded rod proximal to the lower end of the cylindrical member. The threaded rod changes a position of the magnifying lens by a linear movement of the threaded rod in an upward direction and a downward direction. The threaded wheel is positioned on the outer cylindrical wall of the cylindrical member. The threaded wheel operably engages with the threaded rod to transfer a rotary motion of the threaded wheel to the threaded rod for the linear movement of the threaded rod in the upward direction and the downward direction. The cylindrical sieve member extends from the closed lower end of the cylindrical member. The cylindrical sieve member is configured to drain a predetermined amount of an extraneous element, for example, water or another liquid, sand, etc., from the magnifying container apparatus, when the threaded rod, in communication with the threaded wheel, traverses the magnifying lens from the closed lower end of the cylindrical member towards a lower end of the cylindrical sieve member.

Disclosed herein is also a method for magnifying and viewing items, and carrying the items in a desired or selectable amount of an extraneous element in the magnifying container apparatus. A user magnifies and views the items present below the magnifying lens in the extraneous element via the magnifying lens of the magnifying container apparatus. The user collects and accommodates the items along with the extraneous element in the space defined by the cylindrical wall and between the open upper end and the closed lower end of the cylindrical member of the magnifying container apparatus. The user drains a predetermined amount of the extraneous element accommodated in the space of the cylindrical member via the cylindrical sieve member of the magnifying container apparatus to the selectable amount, by lowering the magnifying lens towards the lower end of the cylindrical sieve member. The user can lower the magnifying lens by rotating the threaded wheel operably engaged with the threaded rod to transfer the rotary motion of the threaded wheel to the threaded rod for linearly moving the threaded rod from a first position to a second position in the downward direction. The first position is proximal to the closed lower end of the cylindrical member and the second position is proximal to the lower end of the cylindrical sieve member. The user can then raise the magnifying lens towards the lower end of the cylindrical member by linearly moving the threaded rod, in communication with the threaded wheel, from the second position to the first position in the upward direction, to close the lower end of the cylindrical member and carry the items in the selectable amount of the extraneous element in the magnifying container apparatus.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein. The description of a structure or a method step referenced by a numeral in a drawing carries over to the description of that structure or method step shown by that same numeral in any subsequent drawing herein.

DETAILED DESCRIPTION OF THE INVENTION

Figure 1:
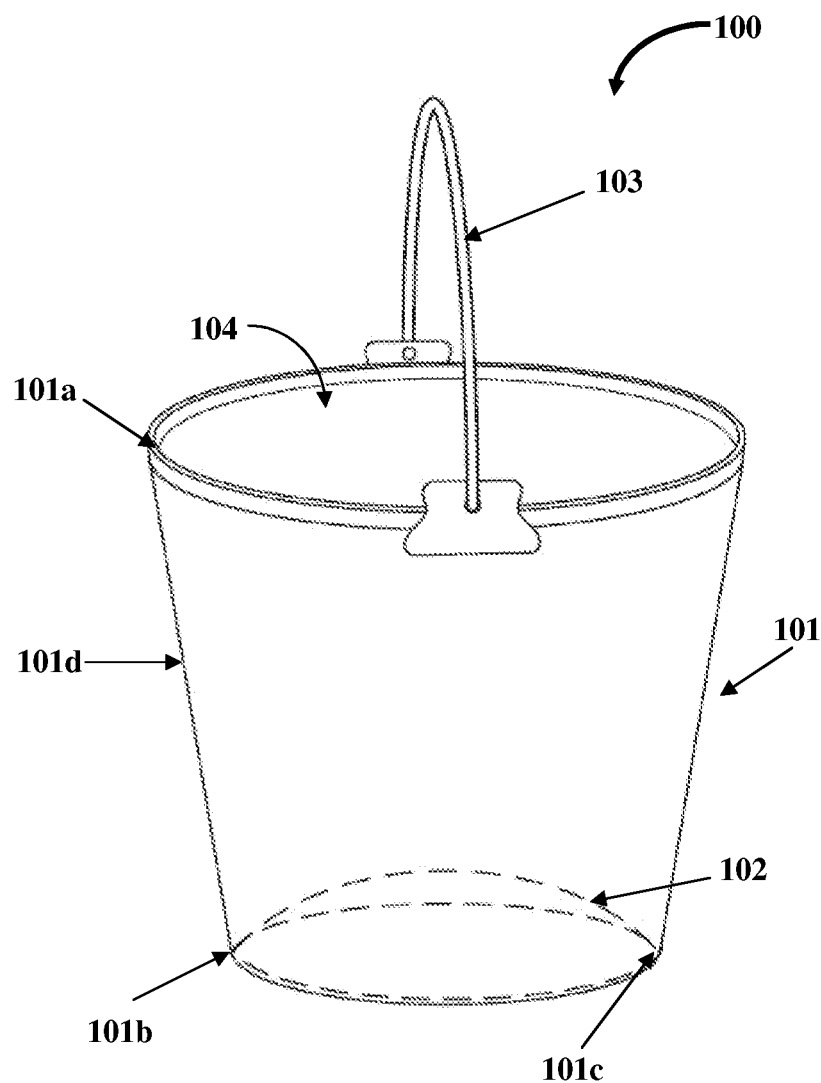
FIG. 1 exemplarily illustrates an isometric view of a magnifying container apparatus.

FIG. 1 exemplarily illustrates an isometric view of a magnifying container apparatus 100. The magnifying container apparatus 100 disclosed herein is configured for magnifying, viewing, and carrying items 201 exemplarily illustrated in FIG. 2 and FIGS. 14A-14B. As used herein, the term "item" refers to any object, for example, elements of marine life such as starfish, sea shells, mussels, shrimp, plants, moss, pebbles, rocks, other aquatic elements, insects such as spiders, ants, etc., frogs, and other animals, etc., that can be viewed or identified at different areas, for example, in a shallow sea bed, an ocean, a pool, a bath tub, etc. The magnifying container apparatus 100 disclosed herein comprises a generally cylindrical member 101 and one or more magnifying lenses 102. For purposes of illustration, the detailed description refers to a single magnifying lens 102 detachably connected to a lower end 101b of the cylindrical member 101 of the magnifying container apparatus 100; however the scope of the magnifying container apparatus 100 disclosed herein is not limited to include only a single magnifying lens 102, but may be extended to included more than one magnifying lens 102 and supplementary magnifying lenses 105 of different focal lengths as exemplarily illustrated in FIG. 6.

The cylindrical member 101 of the magnifying container apparatus 100 is configured in different cross-sectional shapes, for example, a generally cylindrical shape, a generally conical shape, a generally trapezoidal shape, etc. In an embodiment, the cylindrical member 101 is made of a transparent material. The cylindrical member 101 is configured, for example, in the shape of a bucket such as a cylindrical bucket, a truncated cone shaped bucket, etc. The cylindrical member 101 comprises an open upper end 101a and a lower end 101b separated by a generally cylindrical wall 101d extending therebetween. The magnifying lens 102 is detachably connected at an inner periphery 101c of the lower end 101b of the cylindrical member 101 to close the lower end 101b of the cylindrical member 101. The magnifying lens 102 is, for example, a concave lens, a convex lens, or a combination thereof of different shapes, sizes, and shades of color. The magnifying lens 102 is configured to magnify and identify the items 201 present below the magnifying lens 102 and to enable viewing of the items 201. The cylindrical member 101 accommodates and carries the items 201 within a space 104 defined by the cylindrical wall 101d and between the open upper end 101a and the closed lower end 101b of the cylindrical member 101. In an embodiment, the magnifying container apparatus 100 disclosed herein further comprises a handle member 103 detachably attached at the open upper end 101a of the cylindrical member 101. The handle member 103 is configured to be held by a user for carrying the magnifying container apparatus 100.

Figure 2:
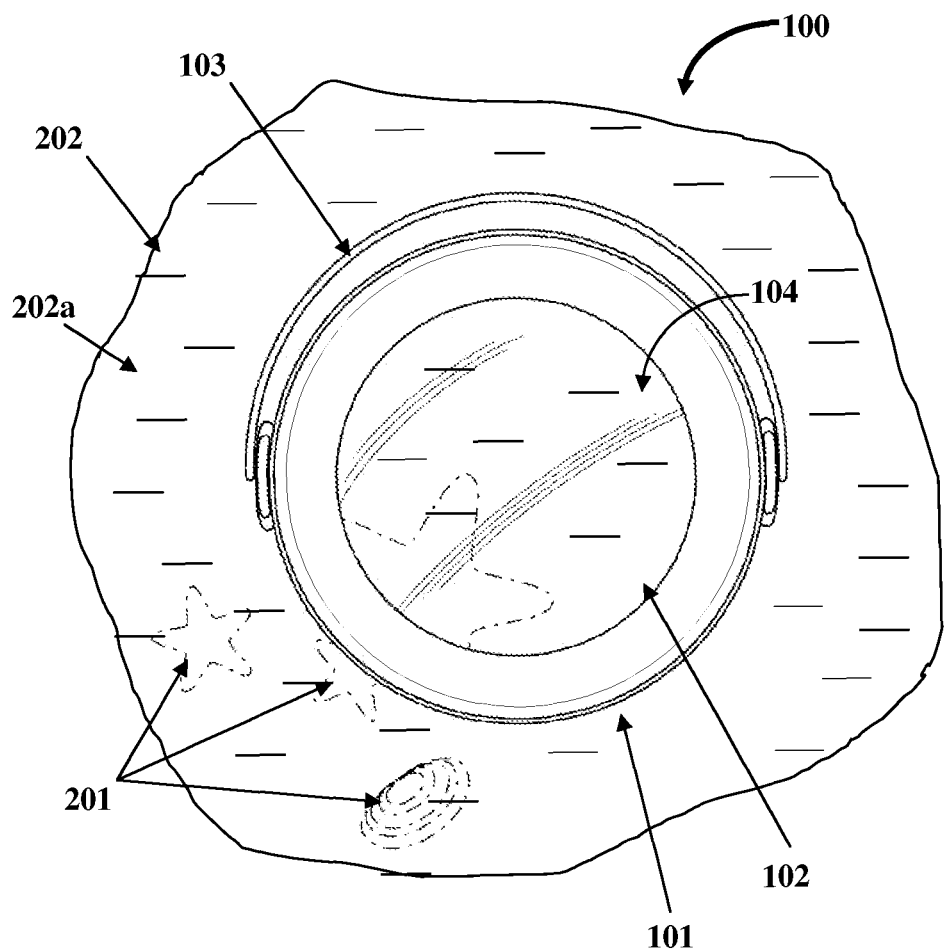
FIG. 2 exemplarily illustrates a top plan view of the magnifying container apparatus, showing items present in an extraneous element being magnified through a magnifying lens of the magnifying container apparatus.

FIG. 2 exemplarily illustrates a top plan view of the magnifying container apparatus 100, showing items 201 present in an extraneous element 202 being magnified through the magnifying lens 102 of the magnifying container apparatus 100. As used herein, the term "extraneous element" refers to any element, for example, water or another liquid, sand, etc., that is external to the items 201 to be magnified, viewed, or collected by a user. As exemplarily illustrated in FIG. 2, the extraneous element 202 is a liquid such as water containing the items 201, for example, starfish, sea shells, other aquatic elements, etc. A user holds the handle member 103 of the magnifying container apparatus 100 and moves the magnifying container apparatus 100 over a surface 202a of the extraneous element 202 containing the items 201. The items 201 under the surface 202a of the extraneous element 202 are magnified through the magnifying lens 102 of the magnifying container apparatus 100, which allows the user to identify the items 201. The user can collect the identified items 201 from the extraneous element 202 and place them in the space 104 defined by the cylindrical wall 101d and between the open upper end 101a and the lower end 101b of the cylindrical member 101 exemplarily illustrated in FIG. 1. The magnifying container apparatus 100 enables a user to magnify and identify items 201, for example, sea shells, mussels, shrimp, etc., from a sea bed and to pick them up.

Figure 3A:
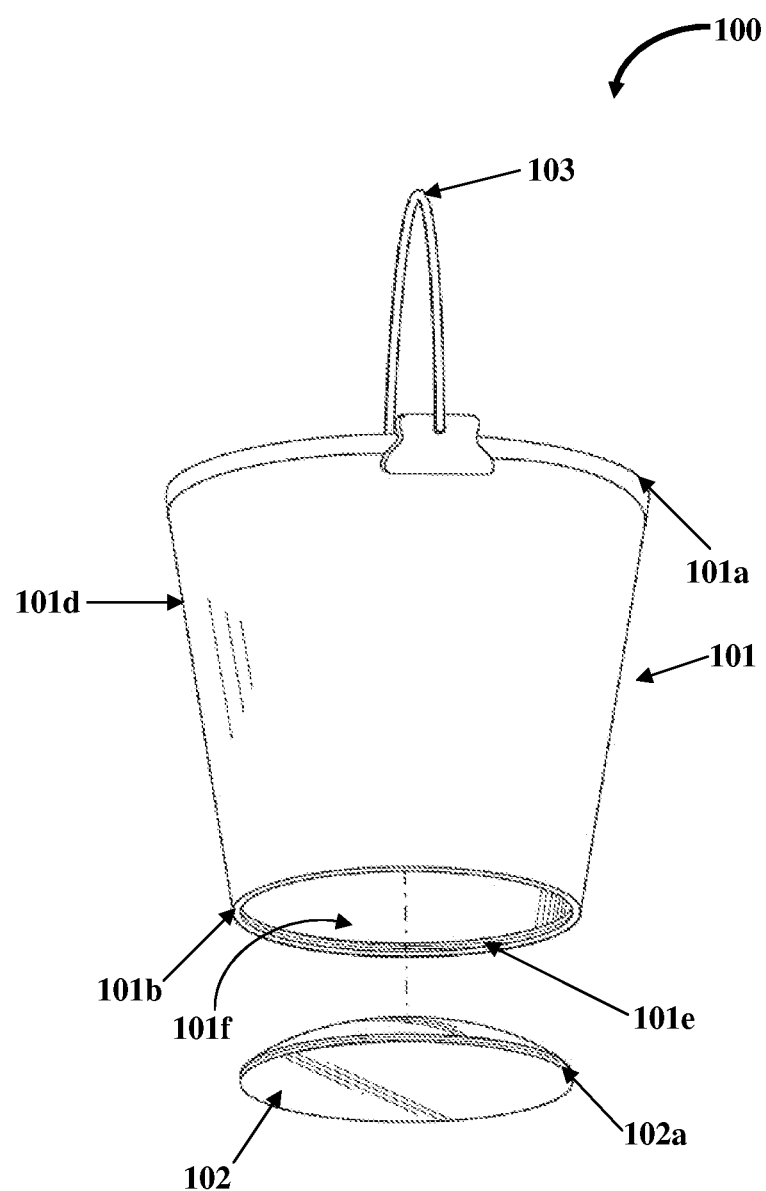
FIG. 3A exemplarily illustrates a partial exploded view of the magnifying container apparatus, showing a threaded edge of the magnifying lens engageable with a lower threaded section of a cylindrical member of the magnifying container apparatus.
Figure 3B:
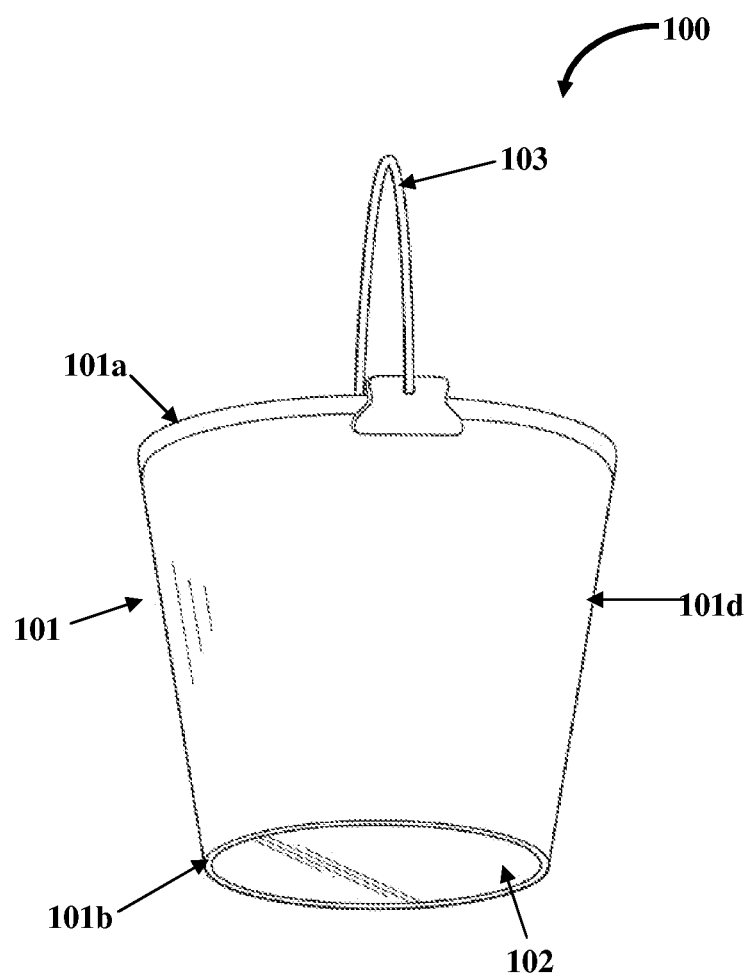
FIG. 3B exemplarily illustrates a bottom perspective view of the magnifying container apparatus, showing the magnifying lens engaged to a lower end of the cylindrical member of the magnifying container apparatus.

FIGS. 3A-3B exemplarily illustrate a partial exploded view and a bottom perspective view respectively, of the magnifying container apparatus 100. FIG. 3A shows a threaded edge 102a of the magnifying lens 102 engageable with a lower threaded section 101e of the cylindrical member 101 of the magnifying container apparatus 100. In an embodiment, a lower threaded section 101e is configured proximal to the lower end 101b of the cylindrical member 101 as exemplarily illustrated in FIG. 3A. The lower threaded section 101e of the cylindrical member 101 is configured along an inner surface 101f of the cylindrical wall 101d of the cylindrical member 101. The threaded edge 102a of the magnifying lens 102 exemplarily illustrated in FIG. 3A, is detachably engaged with the lower threaded section 101e of the cylindrical member 101 for detachably connecting the magnifying lens 102 to the lower end 101b of the cylindrical member 101 as exemplarily illustrated in FIG. 3B. A user may assemble the magnifying container apparatus 100 on site by threadably engaging the magnifying lens 102 to the cylindrical member 101.

In an embodiment, the magnifying lens 102 is retractable and can be slidably retracted to open the lower end 101b of the cylindrical member 101 for draining the magnifying container apparatus 100. In this embodiment, the magnifying lens 102 can be rotated out from below the lower end 101b of the cylindrical member 101, for example, by a rod (not shown) connected to a lower surface of the magnifying lens 102.

Figure 4A:
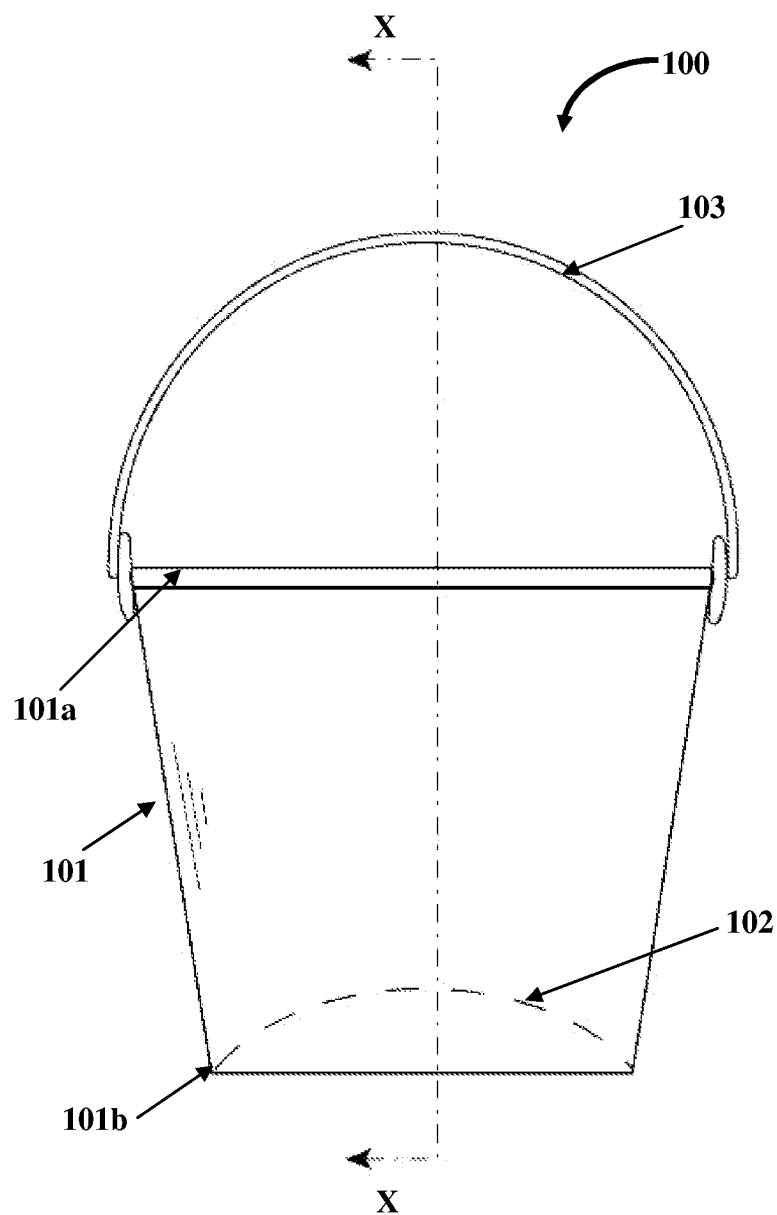
FIG. 4A exemplarily illustrates a front elevation view of the magnifying container apparatus.
Figure 4B:
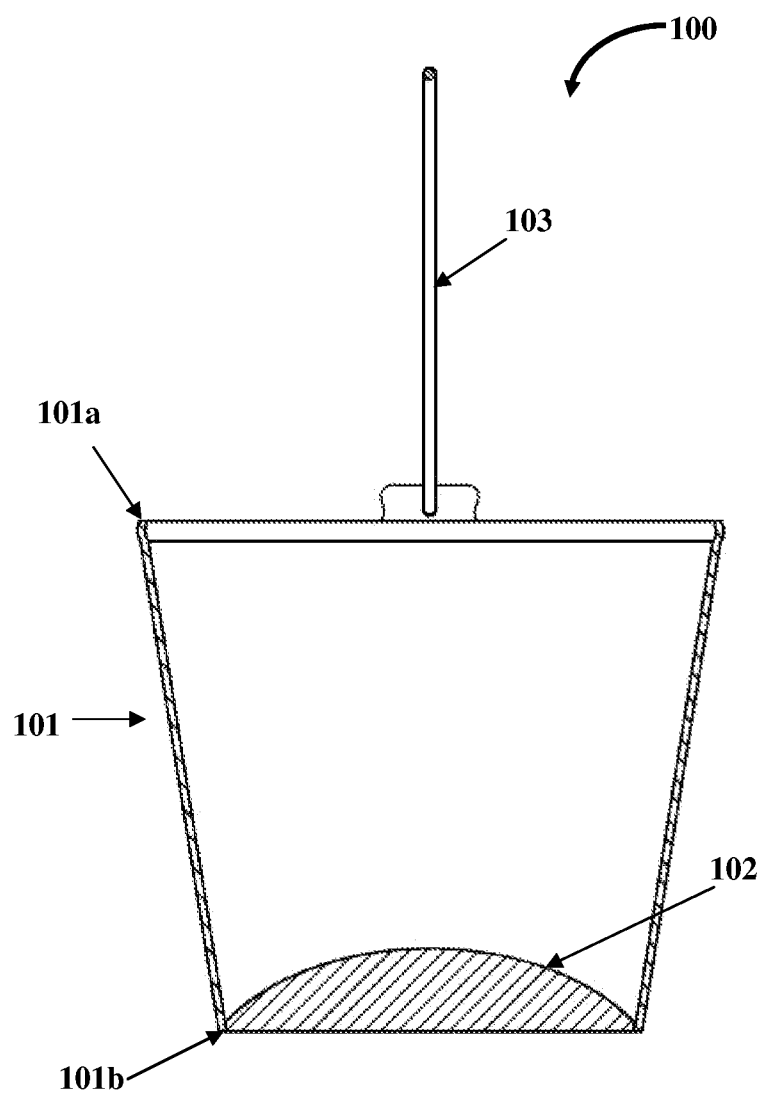
FIG. 4B exemplarily illustrates a sectional view of the magnifying container apparatus taken along a section X-X in FIG. 4A.

FIG. 4A exemplarily illustrates a front elevation view of the magnifying container apparatus 100. FIG. 4B exemplarily illustrates a sectional view of the magnifying container apparatus 100 taken along a section X-X in FIG. 4A. The cylindrical member 101 of the magnifying container apparatus 100 is made of, for example, plastic, stainless steel, aluminum, etc. The magnifying lens 102 is made of, for example, crown glass, mid-index plastic, polycarbonate, fiber, etc. The handle member 103 is generally made of, for example, a metal, wood, plastic, etc. As exemplarily illustrated in FIG. 4B, the magnifying lens 102 curves inwardly within the cylindrical member 101 of the magnifying container apparatus 100.

Figure 5A:
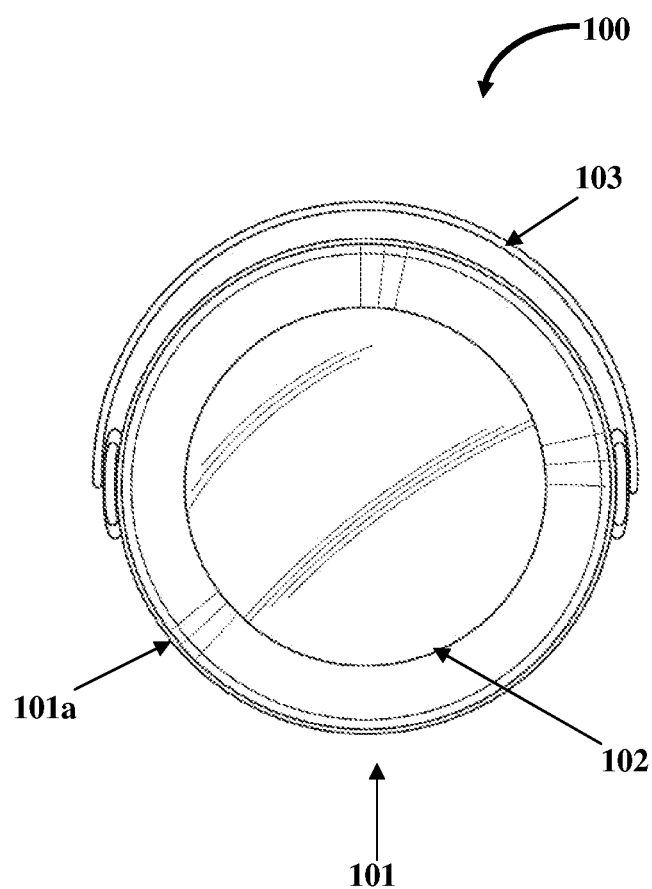
FIG. 5A exemplarily illustrates a top plan view of the magnifying container apparatus.
Figure 5B:
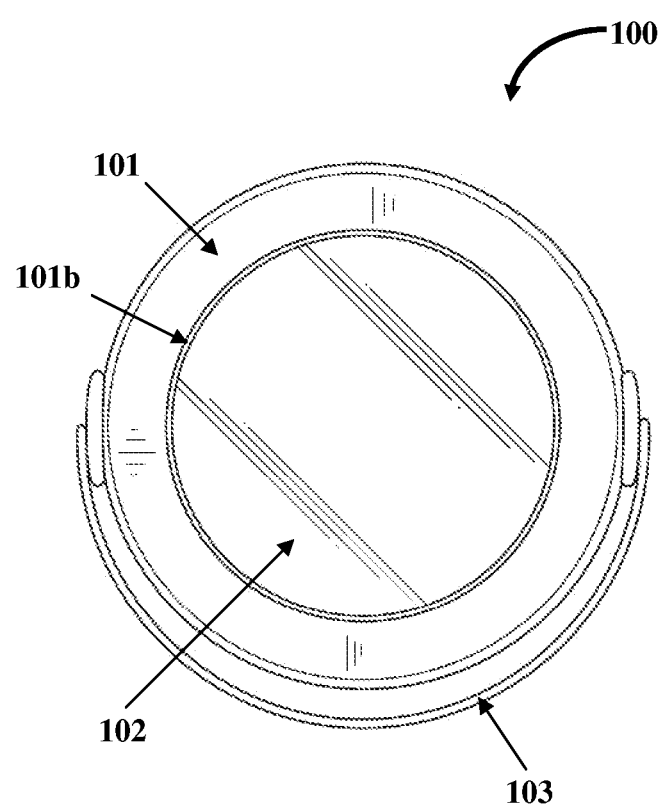
FIG. 5B exemplarily illustrates a bottom view of the magnifying container apparatus.

FIGS. 5A-5B exemplarily illustrate a top plan view and a bottom view respectively of the magnifying container apparatus 100. In an embodiment, the magnifying lens 102 is concentrically disposed at the lower end 101b of the cylindrical member 101 as exemplarily illustrated in FIG. 5B. The user holds the magnifying container apparatus 100 with the open upper end 101a of the cylindrical member 101 proximal to the eyes of the user and views through the magnifying lens 102 concentrically disposed at the lower end 101b of the cylindrical member 101. The magnifying container apparatus 100 may be used, for example, in aquatic research for identifying and collecting aquatic elements such as fish, plants, etc. The magnifying container apparatus 100 may also be used, for example, in chemical research allowing researchers to identify and collect items 201 such as mineral samples in a specified amount of an extraneous element 202 such as water as exemplarily illustrated and disclosed in the detailed description of FIGS. 14A-14B.

Figure 6:
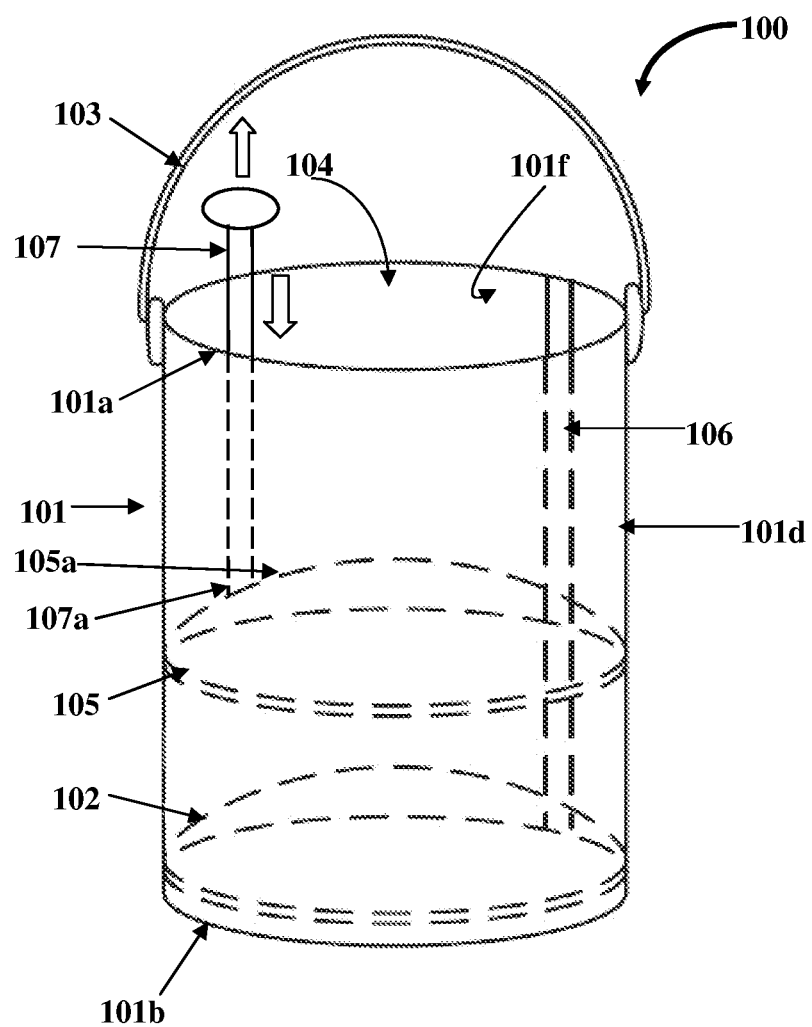
FIG. 6 exemplarily illustrates an isometric view of an embodiment of the magnifying container apparatus, showing a supplementary magnifying lens positioned within a space defined in the cylindrical member of the magnifying container apparatus.

FIG. 6 exemplarily illustrates an isometric view of an embodiment of the magnifying container apparatus 100, showing a supplementary magnifying lens 105 positioned within a space 104 defined in the cylindrical member 101 of the magnifying container apparatus 100. In an embodiment, the magnifying container apparatus 100 disclosed herein further comprises a supplementary magnifying lens 105 of a predetermined size positioned within the space 104 defined by the cylindrical wall 101d and between the open upper end 101a and the closed lower end 101b of the cylindrical member 101. The supplementary magnifying lens 105 is connected along an inner surface 101f of the cylindrical wall 101d of the cylindrical member 101. The supplementary magnifying lens 105 is, for example, a concave lens, a convex lens, or a combination thereof. The supplementary magnifying lens 105 is of a predefined focal length, for example, about 25 cm to about 50 cm. The supplementary magnifying lens 105 is configured to traverse along a track 106 configured along the inner surface 101f of the cylindrical wall 101d from the open upper end 101a to the closed lower end 101b of the cylindrical member 101. In an embodiment, a lens handle 107 is operably connected to the supplementary magnifying lens 105 for adjusting the position of the supplementary magnifying lens 105. An opposing end 107a of the lens handle 107 is fixedly attached to an upper section 105a of the supplementary magnifying lens 105. A user may pull up the lens handle 107 to move the supplementary magnifying lens 105 in an upward direction and push down the lens handle 107 to move the supplementary magnifying lens 105 in a downward direction. The supplementary magnifying lens 105 is in slidable contact with the track 106 along the inner surface 101f of the cylindrical wall 101d of the cylindrical member 101 when the supplementary magnifying lens 105 is pulled in the upward direction and pushed in the downward direction by the lens handle 107. The track 106 is lubricated for a smooth movement of the supplementary magnifying lens 105 in the upward direction and the downward direction to avoid breakage of the supplementary magnifying lens 105.

Figure 7A:
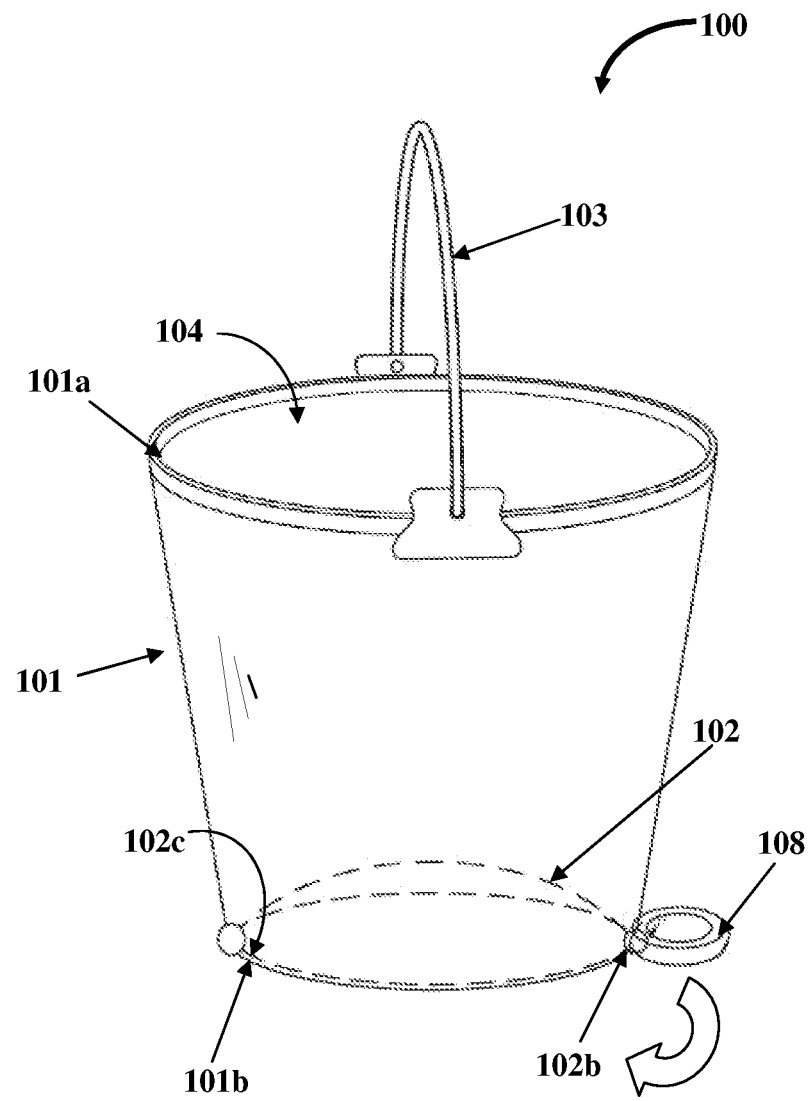
FIGS. 7A-7B exemplarily illustrate front perspective views of an embodiment of the magnifying container apparatus, showing the magnifying lens hingedly connected to the lower end of the cylindrical member.
Figure 7B:
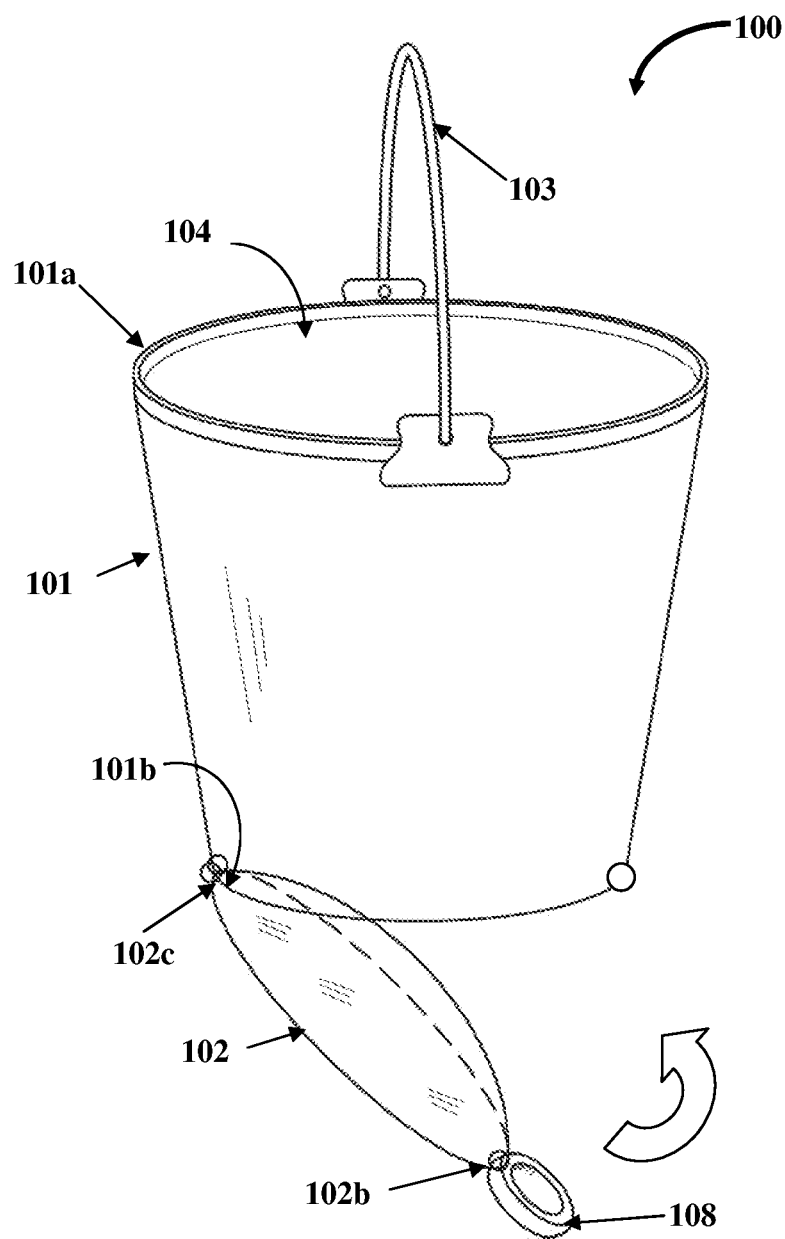

FIGS. 7A-7B exemplarily illustrate front perspective views of an embodiment of the magnifying container apparatus 100, showing the magnifying lens 102 hingedly connected to the lower end 101b of the cylindrical member 101. In this embodiment, the magnifying container apparatus 100 disclosed herein further comprises a lens handle 108 configured, for example, in the shape of a ring, fixedly connected to a circumferential edge 102b of the magnifying lens 102. A diametrically opposing circumferential edge 102c of the magnifying lens 102 is hingedly connected to the lower end 101b of the cylindrical member 101. The magnifying lens 102 is hingedly connected to the lower end 101b of the cylindrical member 101 for opening and closing the lower end 101b of the cylindrical member 101. FIG. 7A exemplarily illustrates the hingedly connected magnifying lens 102 in a closed position to close the lower end 101b of the cylindrical member 101. FIG. 7B exemplarily illustrates the hingedly connected magnifying lens 102 in an open position to open the lower end 101b of the cylindrical member 101. A user may grip the lens handle 108 and lower the hingedly connected magnifying lens 102 to open the lower end 101b of the cylindrical member 101 and drain a predetermined amount of an extraneous element 202, for example, water exemplarily illustrated in FIG. 2, from the magnifying container apparatus 100. The user may also lower the hingedly connected magnifying lens 102 to open the lower end 101b of the cylindrical member 101 and drain all the contents from the magnifying container apparatus 100.

Figure 8:
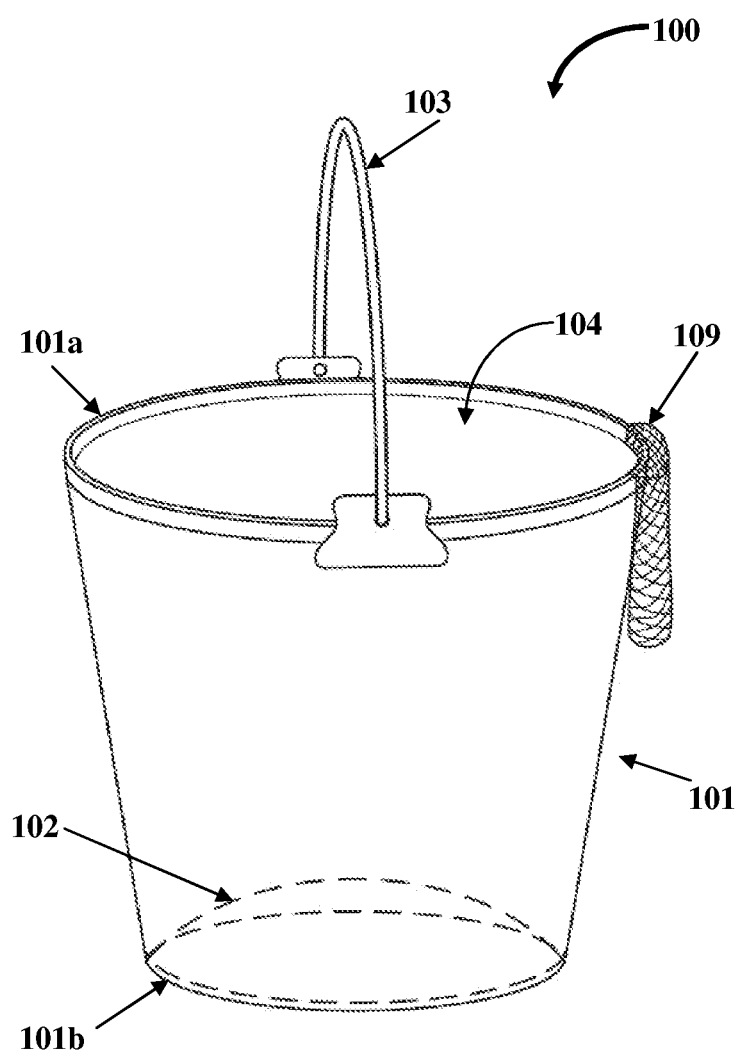
FIG. 8 exemplarily illustrates a front perspective view of an embodiment of the magnifying container apparatus, showing a pouch attached to the cylindrical member of the magnifying container apparatus.

FIG. 8 exemplarily illustrates a front perspective view of an embodiment of the magnifying container apparatus 100, showing a pouch 109 attached to the cylindrical member 101 of the magnifying container apparatus 100. In an embodiment, the magnifying container apparatus 100 disclosed herein further comprises one or more pouches 109 attached at the open upper end 101a of the cylindrical member 101. The user uses a pouch 109 to store one or more of the items 201 present under the surface 202a of the extraneous element 202, for example, water, sand, etc., exemplarily illustrated in FIG. 2.

Figure 9:
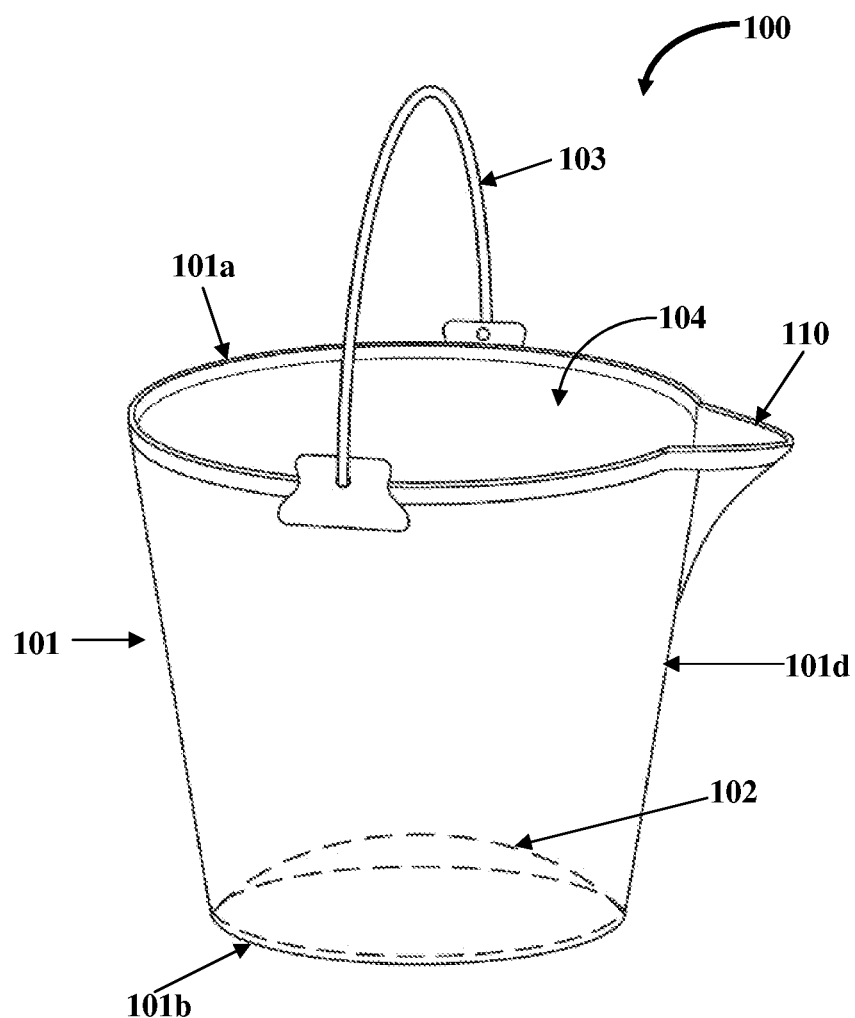
FIG. 9 exemplarily illustrates a front perspective view of an embodiment of the magnifying container apparatus, showing a spout defined on the cylindrical member of the magnifying container apparatus.

FIG. 9 exemplarily illustrates a front perspective view of an embodiment of the magnifying container apparatus 100, showing a spout 110 defined on the cylindrical member 101 of the magnifying container apparatus 100. In an embodiment, the magnifying container apparatus 100 disclosed herein further comprises a spout 110 defined at the open upper end 101a of the cylindrical member 101. The spout 110 converges flow of an extraneous element 202, for example, water, sand, etc., exemplarily illustrated in FIG. 2, contained in the magnifying container apparatus 100, and conveys the extraneous element 202 out from the magnifying container apparatus 100. The user transfers the extraneous element 202 from the magnifying container apparatus 100 to another storage source, for example, a bucket, a cup, etc., via the spout 110 to uniformly channel the flow of the extraneous element 202 from the space 104 defined by the cylindrical wall 101d and between the open upper end 101a and the lower end 101b of the cylindrical member 101. The user may also drain the extraneous element 202 from the magnifying container apparatus 100 via the spout 110.

Figure 10:
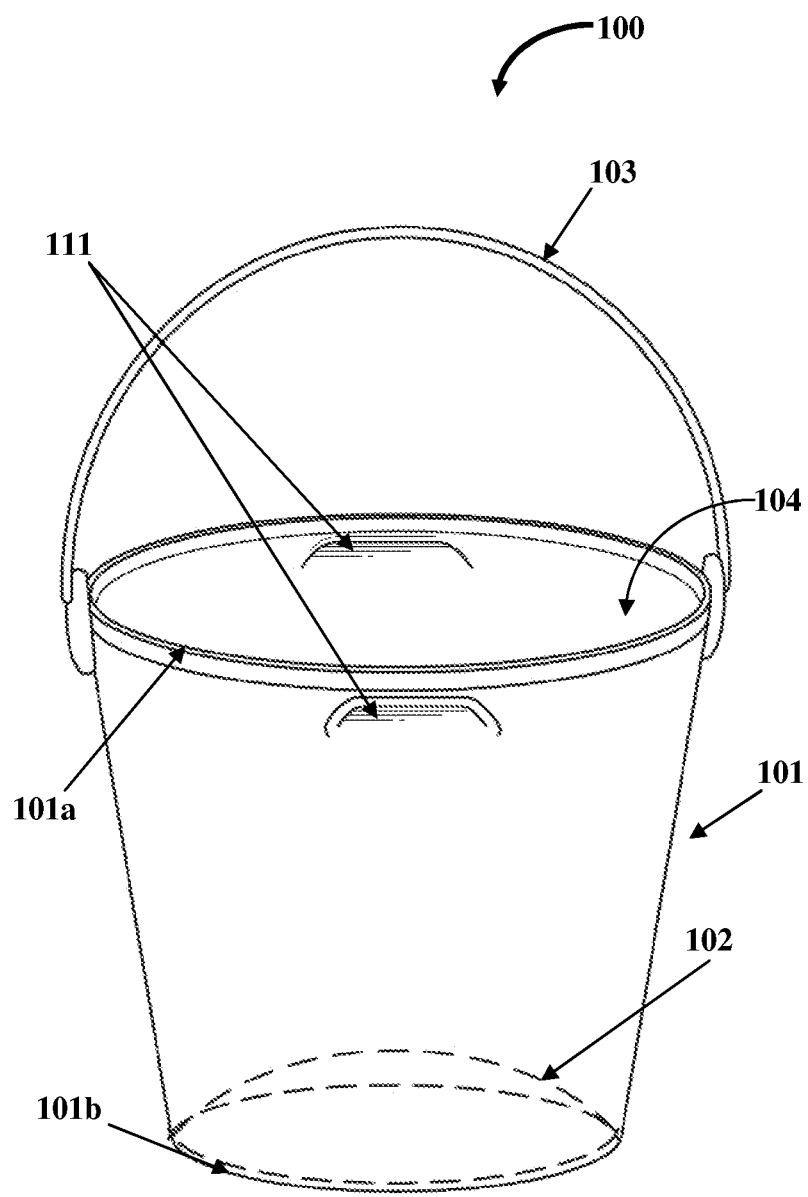
FIG. 10 exemplarily illustrates a front perspective view of an embodiment of the magnifying container apparatus, showing handle grips defined on the cylindrical member of the magnifying container apparatus.

FIG. 10 exemplarily illustrates a front perspective view of an embodiment of the magnifying container apparatus 100, showing handle grips 111 defined on the cylindrical member 101 of the magnifying container apparatus 100. In an embodiment, the magnifying container apparatus 100 disclosed herein further comprises one or more handle grips 111 defined proximal to or below the open upper end 101a of the cylindrical member 101. The handle grips 111 are configured to be gripped by the user for gripping the magnifying container apparatus 100. The user grips the magnifying container apparatus 100 using the handle grips 111 or the handle member 103.

Figure 11A:
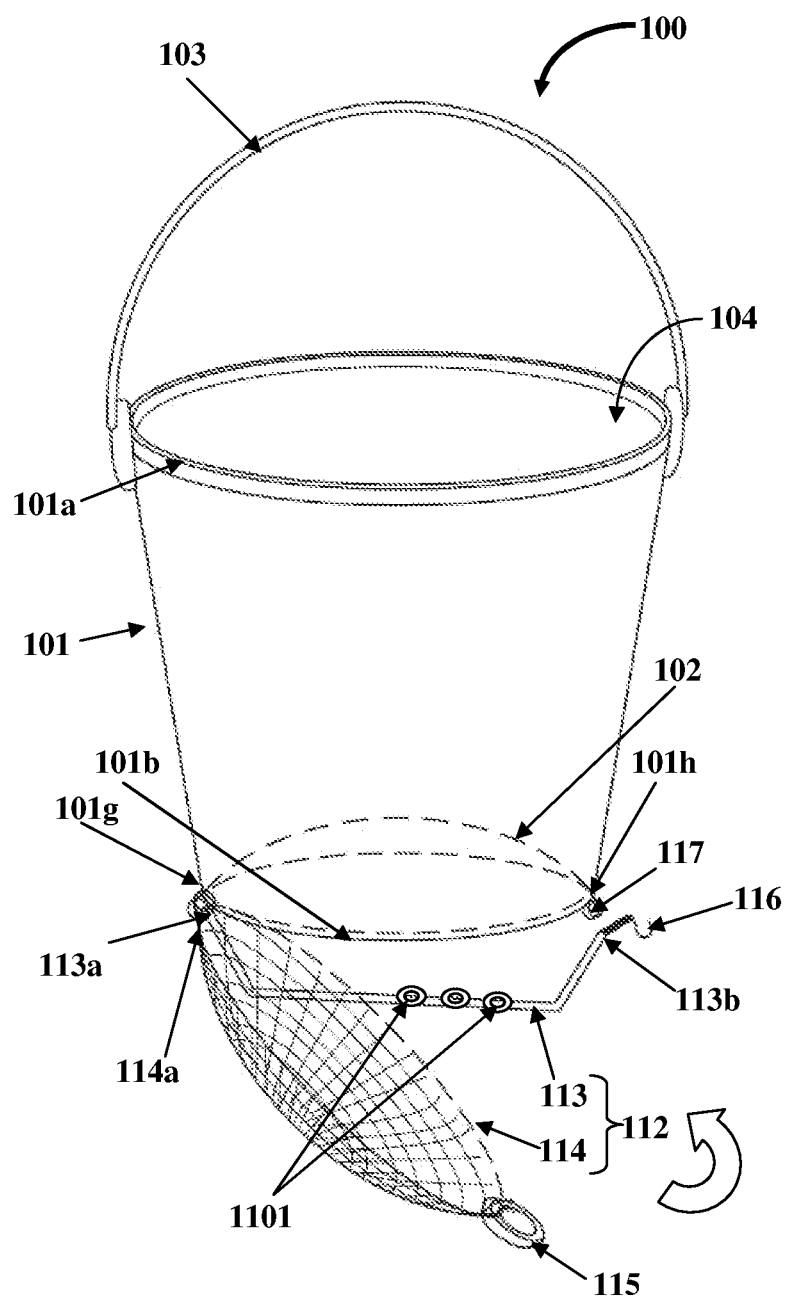
FIGS. 11A-11B exemplarily illustrate perspective views of an embodiment of the magnifying container apparatus, showing a trap assembly attached to the lower end of the cylindrical member of the magnifying container apparatus.
Figure 11B:
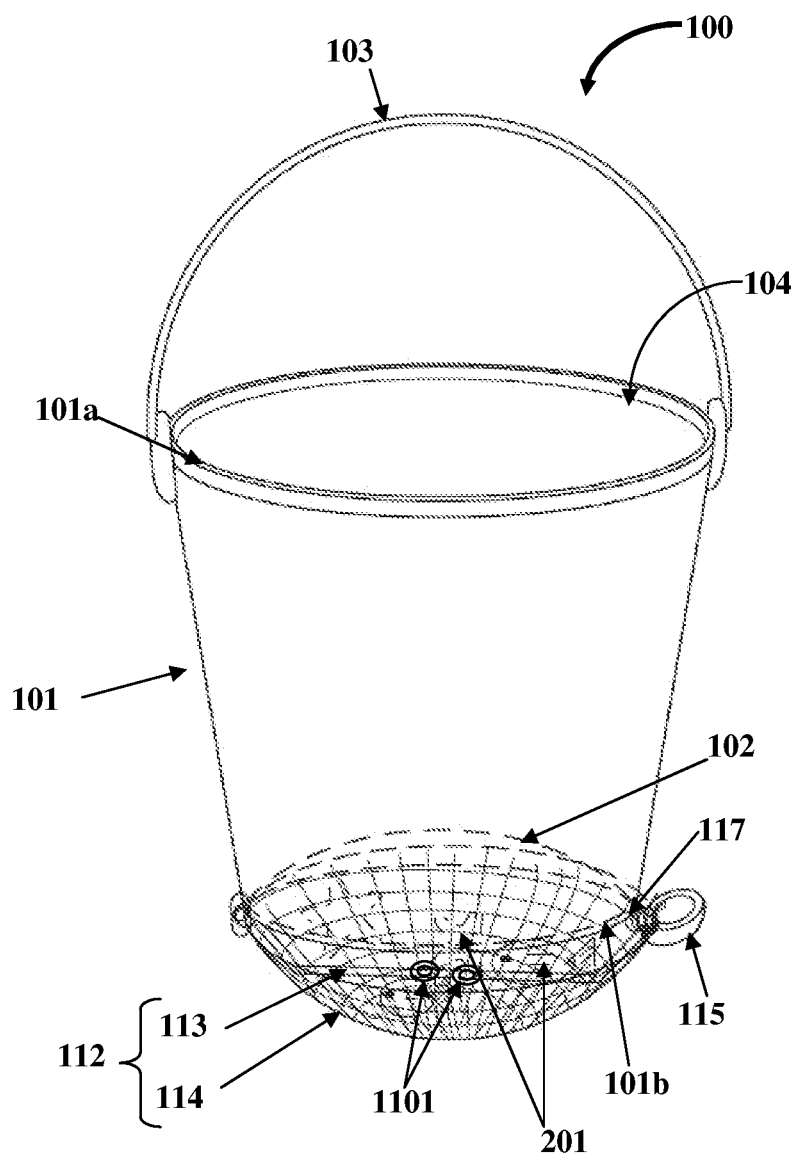

FIGS. 11A-11B exemplarily illustrate perspective views of an embodiment of the magnifying container apparatus 100, showing a trap assembly 112 attached to the lower end 101b of the cylindrical member 101 of the magnifying container apparatus 100. In this embodiment, the magnifying container apparatus 100 disclosed herein further comprises a trap assembly 112 detachably attached to the closed lower end 101b of the cylindrical member 101. The trap assembly 112 comprises, for example, a rod member 113 and a net member 114. One end 113a of the rod member 113 is hingedly connected to one edge 101g of the closed lower end 101b of the cylindrical member 101 as exemplarily illustrated in FIG. 11A. The rod member 113 is configured to accommodate particles, for example, food particles 1101, etc., to attract items 201, for example, fish exemplarily illustrated in FIG. 2, for viewing through the magnifying lens 102. The net member 114 is detachably attached to the closed lower end 101b of the cylindrical member 101. For example, one edge 114a of the net member 114 is hingedly connected to the edge 101g of the closed lower end 101b of the cylindrical member 101 as exemplarily illustrated in FIG. 11A. The net member 114 traps the items 201 below the closed lower end 101b of the cylindrical member 101.

In an example, a user attaches food particles 1101, for example, fish food, worms, etc., on the rod member 113 of the magnifying container apparatus 100 and hooks the rod member 113 to the closed lower end 101b of the cylindrical member 101 via a hook member 116 attached to the distal end 113b of the rod member 113. The hook member 116 is hooked onto a hook receiver 117 provided at a diametrically opposing edge 101h of the closed lower end 101b of the cylindrical member 101. The user holds the magnifying container apparatus 100 over the extraneous element 202, for example, water and leaves the net member 114 in an open position as exemplarily illustrated in FIG. 11A. Items 201, for example, marine life forms such as fish, amphibians, etc., are attracted to the food particles 1101 and move towards the closed lower end 101b of the cylindrical member 101. The user can view the items 201 through the magnifying lens 102 of the magnifying container apparatus 100. On identifying the items 201 via the magnifying lens 102 of the magnifying container apparatus 100, the user can trap the identified items 201 using the net member 114. To trap the identified items 201, the user grips a net handle 115 configured on the net member 114 and closes the net member 114 by clipping the net handle 115 to the hook receiver 117 provided at the opposing edge 101h of the closed lower end 101b of the cylindrical member 101.

Figure 12:
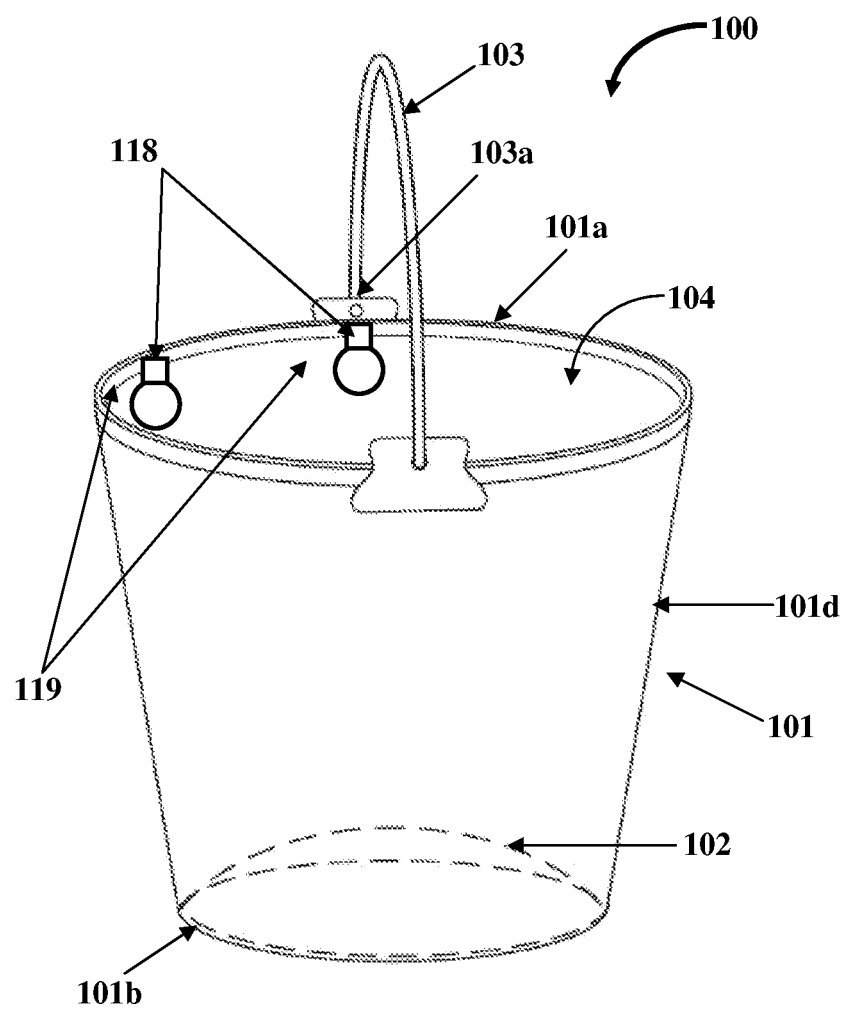
FIG. 12 exemplarily illustrates a front perspective view of an embodiment of the magnifying container apparatus, showing light sources operably connected to the cylindrical member of the magnifying container apparatus.

FIG. 12 exemplarily illustrates a front perspective view of an embodiment of the magnifying container apparatus 100, showing light sources 118 operably connected to the cylindrical member 101 of the magnifying container apparatus 100. In an embodiment, the magnifying container apparatus 100 disclosed herein further comprises one or more light sources 118 operably connected to one or more locations 119 on the cylindrical member 101. One of the locations 119 is, for example, proximal to one end 103a of the handle member 103 and another one of the locations 119 is proximal to the open upper end 101a of the cylindrical member 101. The light sources 118 illuminate the magnifying container apparatus 100 and areas proximal to the magnifying container apparatus 100. For example, the light sources 118 are used to illuminate the space 104 defined by the cylindrical wall 101d and between the open upper end 101a and the lower end 101b of the cylindrical member 101 to allow a user to identify and view items 201 as exemplarily illustrated in FIG. 2 and FIGS. 14A-14B, for example, sea shells, starfish, etc., present below the magnifying container apparatus 100 through the magnifying lens 102 in the dark.

Figure 13:
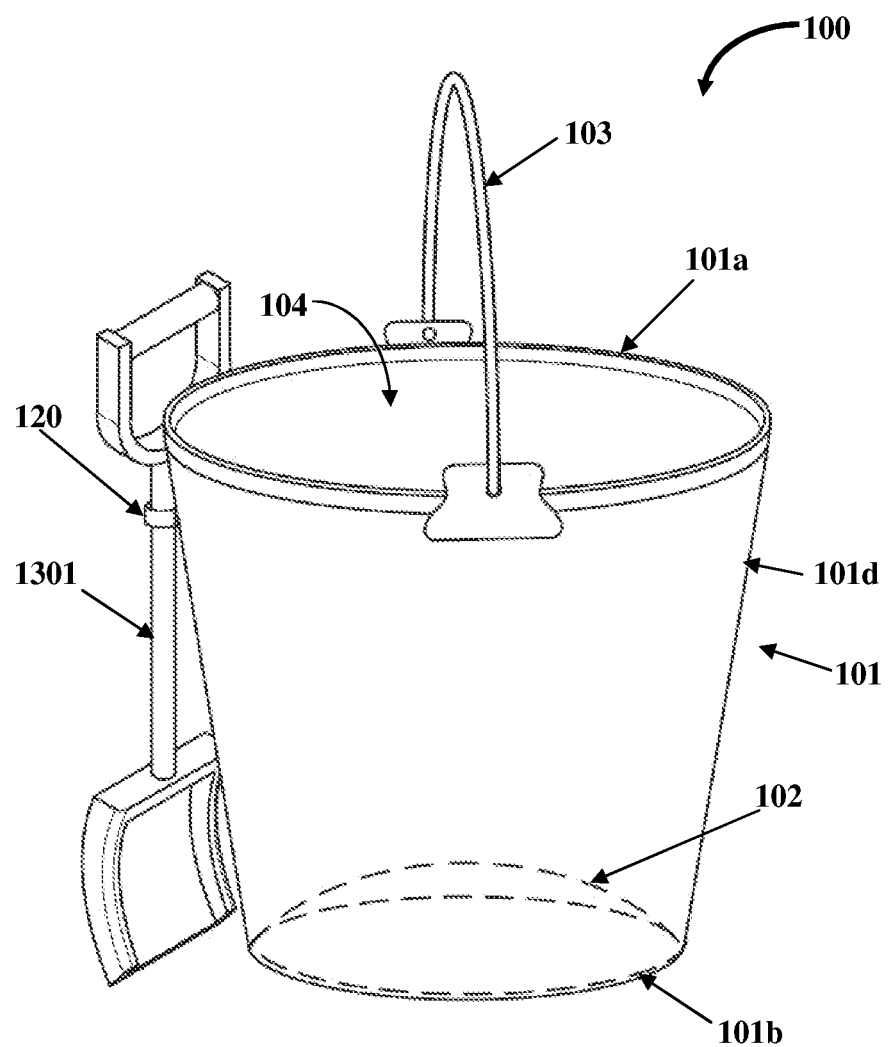
FIG. 13 exemplarily illustrates a front perspective view of the magnifying container apparatus, showing a shovel removably attached to the cylindrical member of the magnifying container apparatus.

FIG. 13 exemplarily illustrates a front perspective view of the magnifying container apparatus 100, showing a shovel 1301 removably attached to the cylindrical member 101 of the magnifying container apparatus 100. The user uses the shovel 1301 to pick up the items 201 present in the extraneous element 202, for example, water exemplarily illustrated in FIG. 2, to be carried and accommodated in the space 104 defined by the cylindrical wall 101d and between the open upper end 101a and the lower end 101b of the cylindrical member 101. The shovel 1301 may be attached proximal to the open upper end 101a of the cylindrical member 101 via a clip member 120 attached on the outer cylindrical wall 101d and below the open upper end 101a of the cylindrical member 101. The user may also use the shovel 1301 to remove the items 201 from the magnifying container apparatus 100.

Figure 14A:
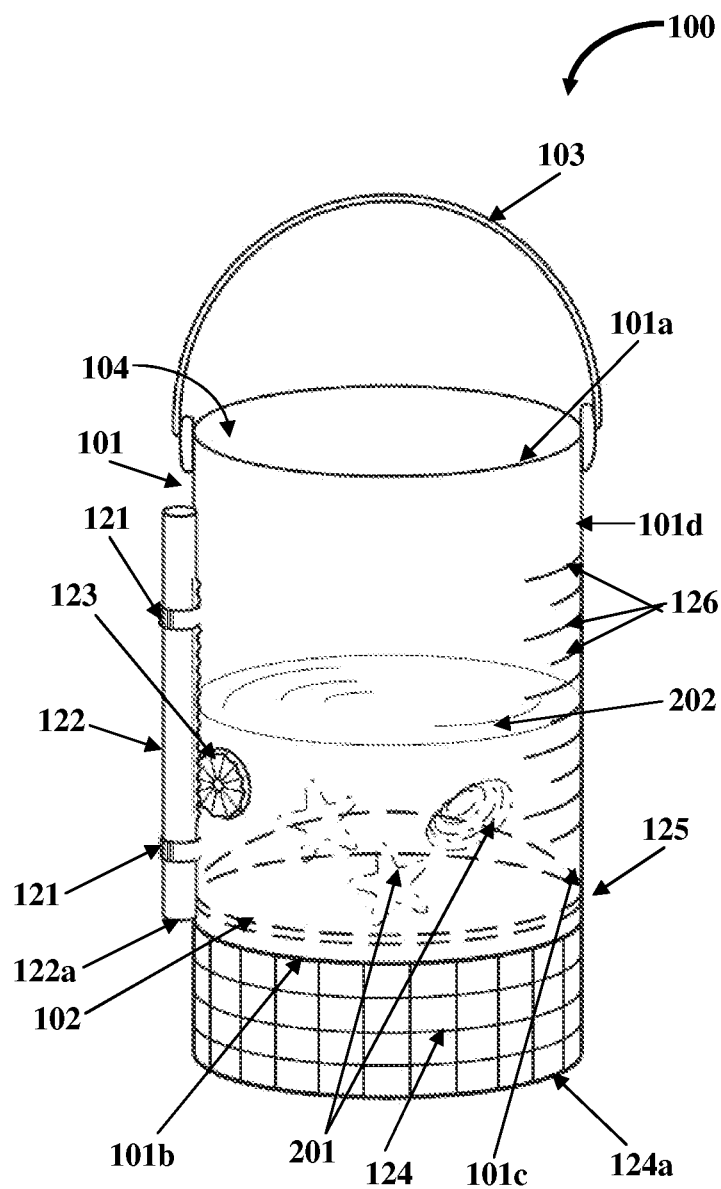
FIGS. 14A-14B exemplarily illustrate front perspective views of an embodiment of the magnifying container apparatus, showing lowering of the magnifying lens from a first position to a second position for draining an extraneous element from the magnifying container apparatus.
Figure 14B:
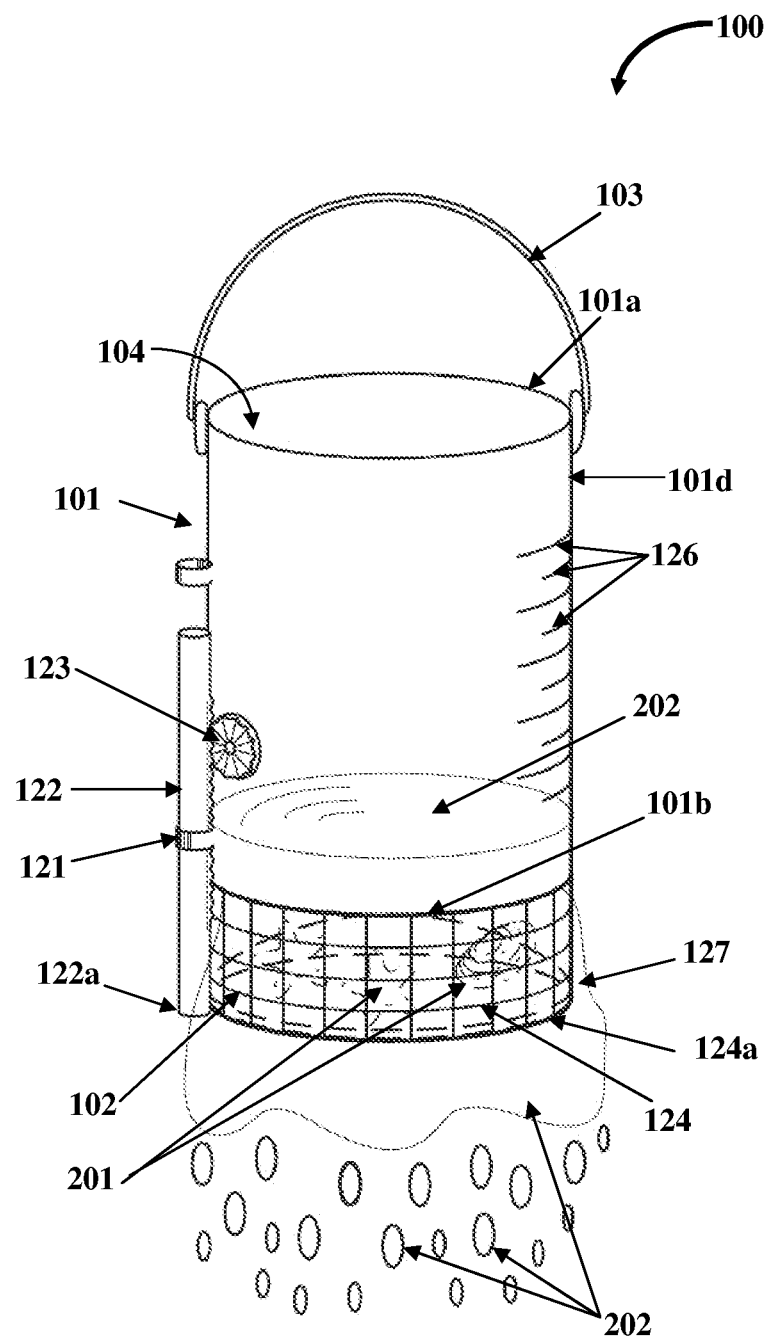

FIGS. 14A-14B exemplarily illustrate front perspective views of an embodiment of the magnifying container apparatus 100, showing lowering of the magnifying lens 102 from a first position 125 to a second position 127 for draining an extraneous element 202 from the magnifying container apparatus 100. The magnifying container apparatus 100 is used for magnifying and viewing items 201, and carrying the items 201 in a desired or selectable amount of an extraneous element 202, for example, water in the magnifying container apparatus 100. In this embodiment, the magnifying container apparatus 100 further comprises at least one guide ring member 121, a threaded rod 122, and a threaded wheel 123. The magnifying lens 102 of the magnifying container apparatus 100 is operably connected to a lower end 122a of the threaded rod 122 proximal to the lower end 101b of the cylindrical member 101.

As exemplarily illustrated in FIGS. 14A-14B, two guide ring members 121 are fixedly attached to the outer cylindrical wall 101d of the cylindrical member 101. The threaded rod 122 is slidably inserted into the guide ring members 121. In an embodiment, the magnifying container apparatus 100 further comprises a generally cylindrical sieve member 124. The threaded rod 122 changes positions 125 and 127 of the magnifying lens 102 by a linear movement of the threaded rod 122 in an upward direction and a downward direction. The positions 125 and 127 comprise a first position 125 proximal to the lower end 101b of the cylindrical member 101 and a second position 127 proximal to a lower end 124a of the cylindrical sieve member 124. The threaded wheel 123 is positioned on and fastened to the outer cylindrical wall 101d of the cylindrical member 101. The threaded wheel 123 operably engages with the threaded rod 122 to transfer a rotary motion of the threaded wheel 123 to the threaded rod 122 for the linear movement of the threaded rod 122 in the upward direction and the downward direction.

The cylindrical sieve member 124 extends from the closed lower end 101b of the cylindrical member 101. The cylindrical sieve member 124 is configured to drain a predetermined amount of the extraneous element 202 from the magnifying container apparatus 100, when the threaded rod 122, in communication with the threaded wheel 123, traverses the magnifying lens 102 from the first position 125 proximal to the closed lower end 101b of the cylindrical member 101 exemplarily illustrated in FIG. 14A, towards a second position 127 proximal to the lower end 124a of the cylindrical sieve member 124 exemplarily illustrated in FIG. 14B. The level of the extraneous element 202 within the cylindrical member 101 can be selected and adjusted using calibrations 126 defined on the outer cylindrical wall 101d of the cylindrical member 101.

Figure 15:
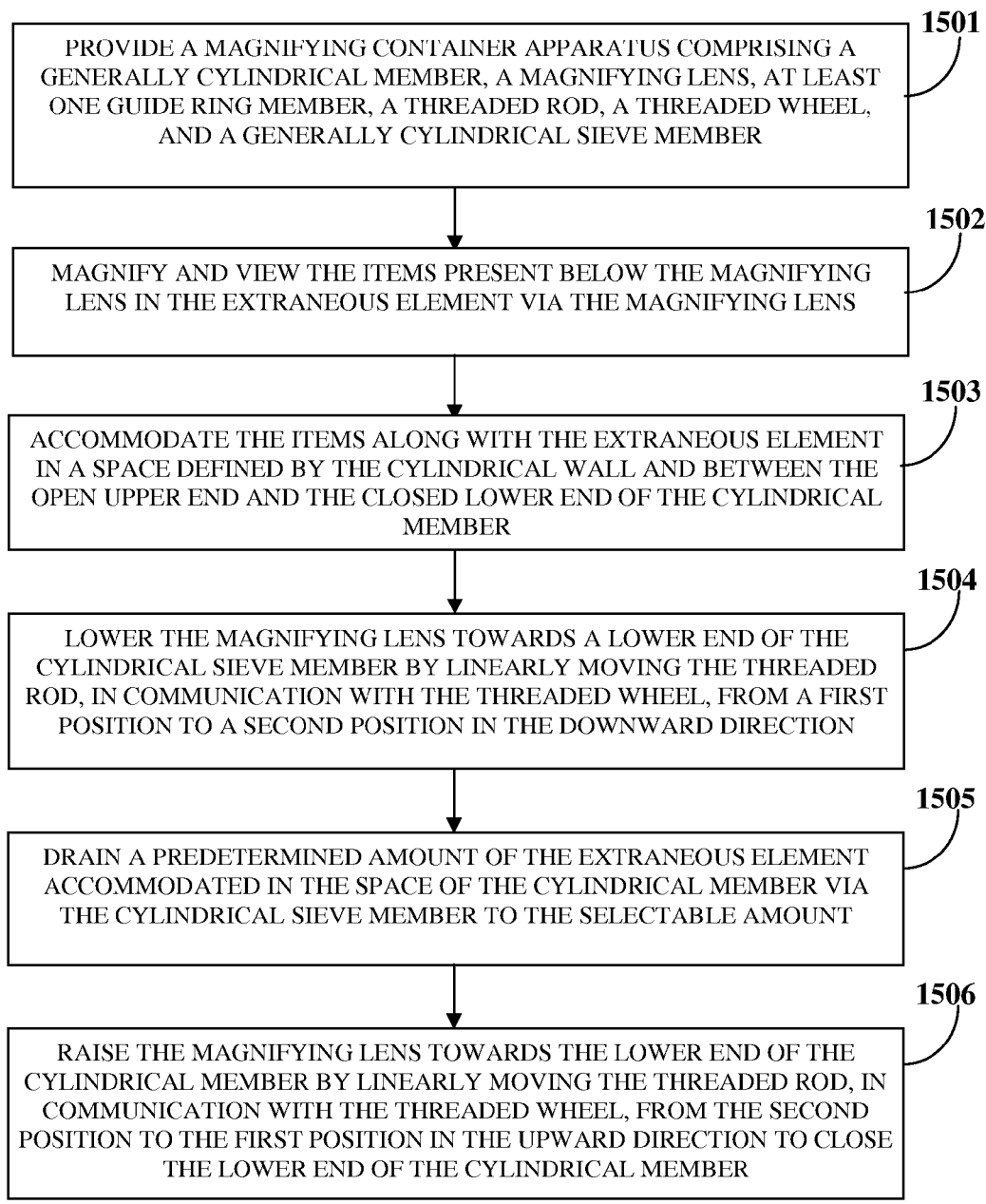
FIG. 15 exemplarily illustrates a method for magnifying and viewing items, and carrying the items in a selectable amount of an extraneous element in the magnifying container apparatus.

FIG. 15 exemplarily illustrates a method for magnifying and viewing items 201 exemplarily illustrated in FIG. 2 and FIGS. 14A-14B, and carrying the items 201 in a selectable amount of an extraneous element 202 in the magnifying container apparatus 100. The magnifying container apparatus 100 comprising the generally cylindrical member 101, one or more magnifying lenses 102, at least one guide ring member 121, the threaded rod 122, the threaded wheel 123, and the generally cylindrical sieve member 124 as disclosed in the detailed description of FIGS. 1-14B is provided 1501. A user magnifies and views 1502 the items 201 present below the magnifying lens 102 of the magnifying container apparatus 100 in the extraneous element 202, for example, water via the magnifying lens 102. The user accommodates 1503 the items 201 along with the extraneous element 202 in a space 104 defined by the cylindrical wall 101d and between the open upper end 101a and the closed lower end 101b of the cylindrical member 101. The user lowers 1504 the magnifying lens 102 towards the lower end 124a of the cylindrical sieve member 124 to drain 1505 a predetermined amount of the extraneous element 202 accommodated in the space 104 of the cylindrical member 101 via the cylindrical sieve member 124 to a selectable amount. The user lowers the magnifying lens 102 towards the lower end 124a of the cylindrical sieve member 124 by rotating the threaded wheel 123 and linearly moving the threaded rod 122, in communication with the threaded wheel 123, from a first position 125, as exemplarily illustrated in FIG. 14A to a second position 127, as exemplarily illustrated in FIG. 14B in a downward direction. The first position 125 is proximal to the closed lower end 101b of the cylindrical member 101 and the second position 127 is proximal to the lower end 124a of the cylindrical sieve member 124. When the desired or selectable amount of the extraneous element 202 is reached in the cylindrical member 101, the user can raise 1506 the magnifying lens 102 towards the lower end 101b of the cylindrical member 101 by linearly moving the threaded rod 122, in communication with the threaded wheel 123, from the second position 127, as exemplarily illustrated in FIG. 14B, to the first position 125, as exemplarily illustrated in FIG. 14A, in the upward direction to close the lower end 101b of the cylindrical member 101 and carry the items 201 in the selectable amount of the extraneous element 202 in the magnifying container apparatus 100.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

I claim:

1. A magnifying container apparatus for magnifying, viewing, and carrying items, said magnifying container apparatus comprising:
    a generally cylindrical member comprising an open upper end and a lower end separated by a generally cylindrical wall extending therebetween, said generally cylindrical member comprising a space defined by said generally cylindrical wall and between said open upper end and said lower end;
    one or more magnifying lenses detachably connected to said lower end of said generally cylindrical member to close said lower end of said generally cylindrical member, said one or more magnifying lenses configured to magnify and identify said items present below said one or more magnifying lenses and to enable said viewing of said items; and
    a trap assembly detachably attached to said closed lower end of said generally cylindrical member, wherein said trap assembly comprises:
        a rod member hingedly connected to said closed lower end of said generally cylindrical member, wherein said rod member is configured to accommodate particles to attract said items for viewing through said one or more magnifying lenses; and
        a net member detachably attached to said closed lower end of said generally cylindrical member, wherein said net member is configured to trap said items below said closed lower end of said generally cylindrical member.

2. The magnifying container apparatus of claim 1, further comprising:
    at least one guide ring member fixedly attached to an outer said generally cylindrical wall of said generally cylindrical member;
    a threaded rod slidably inserted into said at least one guide ring member, wherein said threaded rod is used for changing a position of said one or more magnifying lenses operably connected to a lower end of said threaded rod proximal to said lower end of said generally cylindrical member, by a linear movement of said threaded rod in an upward direction and a downward direction; and
    a threaded wheel positioned on said outer said generally cylindrical wall of said generally cylindrical member, said threaded wheel configured to operably engage with said threaded rod to transfer a rotary motion of said threaded wheel to said threaded rod for said linear movement of said threaded rod in said upward direction and said downward direction.

3. The magnifying container apparatus of claim 2, further comprising a generally cylindrical sieve member extending from said closed lower end of said generally cylindrical member, wherein said generally cylindrical sieve member is configured to drain a predetermined amount of an extraneous element from said magnifying container apparatus, when said threaded rod, in communication with said threaded wheel, traverses said one or more magnifying lenses from said lower end of said generally cylindrical member toward a lower end of said generally cylindrical sieve member.

4. The magnifying container apparatus of claim 1, wherein said one or more magnifying lenses comprise one of a concave lens, a convex lens, and a combination thereof.

5. The magnifying container apparatus of claim 1, further comprising a lower threaded section configured proximal to said lower end of said generally cylindrical member and along an inner surface of said generally cylindrical wall of said generally cylindrical member, wherein a threaded edge of said one or more magnifying lenses is detachably engaged with said lower threaded section of said generally cylindrical member for detachably connecting said one or more magnifying lenses to said lower end of said generally cylindrical member.

6. The magnifying container apparatus of claim 1, further comprising a handle member detachably attached at said open upper end of said generally cylindrical member.

7. The magnifying container apparatus of claim 1, wherein said one or more magnifying lenses are hingedly connected to said lower end of said generally cylindrical member for opening and closing said lower end of said generally cylindrical member.

8. The magnifying container apparatus of claim 1, further comprising one or more pouches attached at said open upper end of said generally cylindrical member, wherein said one or more pouches are configured to store one or more of said items.

9. The magnifying container apparatus of claim 1, further comprising a spout defined at said open upper end of said generally cylindrical member, wherein said spout is configured to converge flow of an extraneous element contained in said magnifying container apparatus and convey said extraneous element out from said magnifying container apparatus.

10. The magnifying container apparatus of claim 1, further comprising one or more light sources operably connected to one or more locations on said generally cylindrical member, wherein said one or more light sources illuminate said magnifying container apparatus and areas proximal to said magnifying container apparatus.

11. The magnifying container apparatus of claim 1, further comprising one or more handle grips defined proximal to said open upper end of said generally cylindrical member, wherein said one or more handle grips are configured to be gripped by a user for gripping said magnifying container apparatus.

12. A magnifying container apparatus for magnifying and viewing items, and carrying said items in a selectable amount of an extraneous element, said magnifying container apparatus comprising:
a generally cylindrical member comprising an open upper end and a lower end separated by a generally cylindrical wall extending therebetween, said generally cylindrical member configured to accommodate and carry said items within a space defined by said generally cylindrical wall and between said open upper end and said lower end;
a magnifying lens detachably connected to said lower end of said generally cylindrical member to close said lower end of said generally cylindrical member, said magnifying lens configured to magnify and identify said items present below said magnifying lens and to enable said viewing of said items;
at least one guide ring member fixedly attached to an outer said generally cylindrical wall of said generally cylindrical member;
a threaded rod slidably inserted into said at least one guide ring member, said threaded rod configured to change a position of said magnifying lens operably connected to a lower end of said threaded rod proximal to said lower end of said generally cylindrical member, by a linear movement of said threaded rod in an upward direction and a downward direction;
a threaded wheel positioned on said outer said generally cylindrical wall of said generally cylindrical member, said threaded wheel configured to operably engage with said threaded rod to transfer a rotary motion of said threaded wheel to said threaded rod for said linear movement of said threaded rod in said upward direction and said downward direction; and
a generally cylindrical sieve member extending from said closed lower end of said generally cylindrical member, said generally cylindrical sieve member configured to drain a predetermined amount of said extraneous element from said magnifying container apparatus, when said threaded rod, in communication with said threaded wheel, traverses said magnifying lens from said lower end of said generally cylindrical member towards a lower end of said generally cylindrical sieve member.

13. The magnifying container apparatus of claim 12, wherein said magnifying lens is one of a concave lens, a convex lens, and a combination thereof.

14. A magnifying container apparatus for magnifying, viewing, and carrying items, said magnifying container apparatus comprising:
a generally cylindrical member comprising an open upper end and a lower end separated by a generally cylindrical wall extending therebetween, said generally cylindrical member configured to accommodate and carry said items within a space defined by said generally cylindrical wall and between said open upper end and said lower end;
one or more magnifying lenses detachably connected to said lower end of said generally cylindrical member to close said lower end of said generally cylindrical member, said one or more magnifying lenses configured to magnify and identify said items present below said one or more magnifying lenses and to enable said viewing of said items; and
one or more supplementary magnifying lenses of predetermined sizes positioned within said space defined by said generally cylindrical wall and between said open upper end and said closed lower end of said generally cylindrical member, and connected along an inner surface of said generally cylindrical wall of said generally cylindrical member, wherein said one or more supplementary magnifying lenses are configured to traverse along a track configured along said inner surface of said generally cylindrical wall from said open upper end to said closed lower end of said generally cylindrical member.

* * * * *